(12) United States Patent
Smith et al.

(10) Patent No.: US 7,375,169 B1
(45) Date of Patent: May 20, 2008

(54) METHOD FOR CATALYST PREPARATION AND IMPROVED POLYETHYLENE BLOW MOLDING RESIN

(75) Inventors: Edward F. Smith, Kingwood, TX (US); Stanley J. Katzen, Baton Rouge, LA (US); Anthony N. Speca, Annapolis, MD (US); Thomas W. Towles, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/657,916

(22) Filed: Jan. 25, 2007

(51) Int. Cl.
*C08F 4/24* (2006.01)

(52) U.S. Cl. .................. 526/104; 526/106; 526/107; 526/126; 526/352

(58) Field of Classification Search ............... 526/104, 526/106, 107, 126, 352
See application file for complete search history.

(56) References Cited

U.S. PATENT DOCUMENTS

| | | | |
|---|---|---|---|
| 3,780,011 A | 12/1973 | Pullukat et al. | |
| 3,887,494 A | 6/1975 | Dietz | |
| 3,976,632 A | 8/1976 | Delap | |
| 3,996,163 A | 12/1976 | Crump et al. | |
| 4,016,343 A | 4/1977 | Hoff et al. | |
| 4,184,979 A * | 1/1980 | Kirch et al. | ............... 502/170 |
| 4,368,303 A | 1/1983 | McDaniel | |
| 4,384,987 A | 5/1983 | Hawley | |
| 4,402,864 A * | 9/1983 | McDaniel | ............... 502/171 |
| 4,728,703 A | 3/1988 | Konrad et al. | |
| 4,877,763 A | 10/1989 | McDaniel et al. | |
| 5,096,868 A * | 3/1992 | Hsieh et al. | ............... 502/107 |
| 5,573,993 A | 11/1996 | Koch | |
| 6,174,981 B1 | 1/2001 | Bergmeister et al. | |
| 6,225,253 B1 * | 5/2001 | Debras | ............... 502/214 |
| 6,921,798 B2 | 7/2005 | Kendrick et al. | |
| 2003/0232715 A1 | 12/2003 | Katzen et al. | |
| 2004/0192863 A1 | 9/2004 | Towles | |
| 2006/0089468 A1 | 4/2006 | Katzen et al. | |

FOREIGN PATENT DOCUMENTS

| | | | |
|---|---|---|---|
| DE | 2622755 | | 8/1977 |
| EP | 0 279 890 | | 8/1988 |
| EP | 0 314 385 | * | 5/1989 |
| EP | 0 882 740 | | 12/1998 |
| EP | 1 172 381 | | 1/2002 |
| WO | 01/32307 | | 5/2001 |

* cited by examiner

*Primary Examiner*—Ling-Siu Choi (57) ABSTRACT

A method for polymerizing ethylene is provided. The method can include preparing a supported catalyst composition comprising the steps of: (a) dehydrating a chromium impregnated support; (b) at least partially dissolving a titanium-containing compound in one or more inert solvents to provide a solution comprising the titanium-containing compound; (c) contacting the dehydrated chromium impregnated support with the titanium-containing solution to provide a mixture comprising the solvent, titanium-containing compound and chromium impregnated support; (d) removing the solvent from the mixture; and (e) activating the product of step (d) at a temperature of at least 800° F. (427° C.) to provide a supported titanated chrome catalyst composition. The supported titanated chrome catalyst composition can be feed to a slurry reactor, and contacted with an optional co-catalyst, under polymerization conditions, with ethylene.

20 Claims, 2 Drawing Sheets

METHOD FOR CATALYST PREPARATION AND IMPROVED POLYETHYLENE BLOW MOLDING RESIN

BACKGROUND OF THE INVENTION

1. Field of the Invention

Embodiments of the present invention generally relate to a process for making polyethylene blow molding resin. More particularly, embodiments of the present invention relate to a slurry polymerization process for making polyethylene blow molding resin using a titanated chrome catalyst.

2. Description of the Related Art

Chrome catalysts, sometimes termed Phillips catalysts, are known catalysts for olefin polymerization. In these catalysts, a chromium compound, such as chromium oxide, is supported on a support of one or more inorganic oxides such as silica, alumina, zirconia or thoria. In olefin polymerization, chrome catalysts have been titanated to provide increased catalyst activity and reduced induction time for polymerization. Titanated chrome catalysts are known to produce polyethylene resins having broader molecular weight and increased melt index and ESCR.

U.S. Pat. No. 3,976,632 and U.S. Pat. No. 3,996,163 disclose synthesizing chrome catalysts in slurry, and adding a titanium ester to titanate the chrome catalyst. The mixture is dried to a free-flowing power, which is then activated in hot air.

EP 0 314 385 discloses another method for synthesizing titanated chromium on silica catalysts useful for gas phase polymerization of ethylene. The catalyst is introduced with an organomagnesium compound, RMgR', either prior to feeding or within the polymerization vessel. The catalyst is titanated using a number of titanium halides, alkyl titanium halides, alkyl titanium alkoxides, alkoxy titanium halides or titanium alkoxides.

EP 0 882 740 discloses the titanation of chromium based catalysts using alkyl titanium alkoxides or titanium alkoxides, which are added to the chromium containing catalysts while at a temperature of at least 300° C. in a fluidized bed under nitrogen.

U.S. Pat. No. 3,780,011 discloses the modification of chromium on $SiO_2$ catalyst by the addition of a titanium ester to a bed of fluidized catalyst held at a temperature of at least 300° C. The esters have the general formula $R_nTi(OR_1)_m$, wherein n+m=4.

U.S. Pat. No. 4,016,343 discloses titanation of silica prior to the addition of the chromium compound to the titanated support. The chromium compound is a tetravalent alkoxide and the titanated support is prepared using titanium esters of the general formula $R_nTi(OR_1)_m$, wherein n+m=4, $TiX_4$, $TiO_2$, alkanolaminetitanates, and titanium acetylacetonate compounds. Titanation is accomplished by mixing the support and the titanium compound and heating at a temperature of about 150-1200° C.

U.S. Pat. No. 4,184,979 discloses the preparation of catalyst by dry blending chromium(acac)$_3$ with a silica support. The mixture is then heated to a temperature of 230-540° C. The catalyst is titanated by adding the liquid titanium compound to a fluidized bed of the chromium catalyst or by passing vapors of the titanium compound through the fluidized bed of the chromium catalyst.

U.S. Pat. No. 4,368,303 discloses a catalyst produced by forming a silica hydrogel; drying said hydrogel to form a xerogel; anhydrously incorporating a titanium compound into said xerogel; wherein chromium is introduced by either coprecipitating same with said silica hydrogel, by combining a water-soluble chromium compound with said hydrogel, or adding anhydrous solution with said hydrogel, or adding anhydrous solution of a chromium compound soluble in non-aqueous solvents to said xerogel; and after said drying and after said chromium is introduced, activating the resulting dried, chromium-containing composition by means of an activation procedure which comprises treatment at an elevated temperature in an atmosphere containing oxygen. In this manner, the process incorporates Ti into the silica rather than deposits Ti on the surface.

U.S. Pat. No. 4,384,987 discloses a method for preparing a polymerization catalyst comprising the steps of contacting a material comprising silica-supported chromium oxide or a compound oxidizable to chromium oxide with a solution of a permanganate compound; heating the thus-contacted material in a reducing atmosphere at a temperature in the range of about 600° C. to about 1100° C.; and then heating the material in an oxygen-containing atmosphere at a temperature in the range of about 450° C. to about 1000° C. for at least about one-half hour.

U.S. Pat. No. 4,402,864 discloses the use of titanium polymers for titanation. The polymers are prepared from $Ti(OR)_4$ and water. The soluble titanium polymer, e.g., $TiO_2$()—$iC_3H_7)_6$ is most conveniently added to a hydrocarbon slurry of the support.

U.S. Pat. No. 4,728,703 discloses the preparation of a chromium on silica catalyst by combining a slurry of silica in an alkane with finely divided $CrO_3$, then adding alcohol, then adding $Ti(OR)_4$. The mixture is dried, and then heated as a fluidized bed first in nitrogen and then in air.

U.S. Pat. No. 5,573,993 discloses a process for preparing activated catalyst for the polymerization of olefins in the absence of solvent. A mixture of a powdered chromium salt with a support is heated to a temperature below the melting temperature of the chromium salt for a period of between 0.5 hours and 18 hours, and then the mixture is heated to an activation temperature.

Other references include EP 0279890; EP 1 172 381; WO 01 32307; DE 2622755; U.S. Pat. No. 3,887,494; U.S. Pat. No. 4,877,763; U.S. Pat. No. 5,096,868; U.S. Pat. No. 6,174,981; U.S. Pat. No. 6,921,798; US 2003/0232715; US 2004/0192863; and US 2006/0089468.

SUMMARY OF THE INVENTION

A method for polymerizing ethylene is provided. In at least one specific embodiment, the method can include preparing a supported catalyst composition comprising the steps of: (a) dehydrating a chromium impregnated support; (b) at least partially dissolving a titanium-containing compound in one or more inert solvents to provide a solution comprising the titanium-containing compound; (c) contacting the dehydrated chromium impregnated support with the titanium-containing solution to provide a mixture comprising the solvent, titanium-containing compound and chromium impregnated support; (d) removing the solvent from the mixture; and (e) activating the product of step (d) at a temperature of at least 800° F. (427° C.) to provide a supported titanated chrome catalyst composition. The supported titanated chrome catalyst composition can be feed to a slurry reactor, and contacted with an optional co-catalyst, under polymerization conditions, with ethylene.

In at least one other specific embodiment, the method includes preparing a supported catalyst composition comprising the steps of: (a) dehydrating a chromium impregnated support; (b) at least partially dissolving a titanium-containing compound in one or more inert solvents to provide a solution comprising the titanium-containing compound; (c) contacting the dehydrated chromium impregnated support with the titanium-containing solution to provide a mixture comprising the solvent, titanium-containing solution to provide a mixture comprising the solvent, titanium-containing compound and chromium impregnated support; (d) removing the solvent from the mixture; and (e) activating the product of step (d) at a temperature of at least 800° F. (427° C.) to provide a supported titanated chrome catalyst composition. The supported titanated chrome catalyst composition can be added to a slurry reactor, and contacted with an optional co-catalyst, under polymerization conditions, with one or more alpha olefins, such as ethylene and 1-hexene.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the invention swill now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

A titanated chrome catalyst and method for olefin polymerization are provided. In at least one specific embodiment, a supported chrome catalyst is dried to remove residual moisture. The dried chrome catalyst is then slurried in one or more hydrocarbon solvents. Preferably, the solvent is isopentane. At least one titanium-containing compound is then added to the slurry. The solvent is removed to provide a finished titanated chrome catalyst, which is then thermally activated, in an air atmosphere, to provide an activated catalyst.

The catalyst can be thermally activated at a temperature of about 800° F. (427° C.), or about 900° F. (482° C.), or about 1000° F. (538° C.), or about 1100° F. (593° C.); or about 1200° F. (649° C.), or about 1300° F. (704° C.), or about 1400° F. (760° C.), or about 1500° F. (816° C.), or about 1600° F. (871° C.) or more. The activation temperature can range from a low of about 800° F. (427° C.), 900° F. (482° C.), or 1000° F. (538° C.) to a high of about 1200° F. (649° C.), 1400° F. (760° C.), or 1600° F. (871° C.). In at least one specific embodiment, the activation temperature is about 1300° F. (704° C.). The activation temperature hold time (i.e. "final hold time") can be more than 2 hours, or more than 3 hours, or more than 4 hours, or more than 6 hours, or more than 8 hours. In one or more embodiments, the activation temperature hold time is about 2-12 hours, or about 2-6 hours, or about 2-4 hours. The recovered, activated catalyst is preferably used for olefin polymerization using a slurry process.

Any suitable supported chrome catalyst can be used. U.S. Pat. No. 2,825,721 and U.S. Pat. No. 3,622,521 disclose suitable supported chrome catalysts and specific methods for impregnating a support with chromium. Suitable supported chrome catalysts are also commercially available. For example, suitable supported chrome catalysts include C-23300 and C-25300 from PQ Corporation. Other commercially available support products include Sylopol 969MPI, HA30, HA30W, HE-3, HA30LF, and 969MSB, all from W.R. Grace & Co. Additional examples include EP30XA and EP30X from INEOS Silicas Americas LLC (formerly Crosfield Catalysts Ltd.).

The supported chrome catalyst can be dehydrated or dried using conventional equipment known in the art. Preferably, the supported chrome catalyst is dehydrated or dried at a temperature of about 100° C. to about 500° C. in a nitrogen atmosphere. The drying temperature can also range from a low of about 100° C., 150° C., or 200° C. to a high of about 200° C., 300° C., or 500° C. The hold time can vary and can be at least 10 hours, or at least 13 hours, or at least 16 hours. A range from about 12 hours to 16 hours is preferred.

The dehydrated catalyst intermediate can be suspended in one or more hydrocarbon liquids to provide a slurry. Suitable hydrocarbons or diluents include alkanes, cycloalkanes, aromatic hydrocarbons, halogenated compounds, ethers, derivatives thereof and mixtures thereof. In one or more embodiments, the diluents can be or include isopentane, n-hexane, decane, cyclohexane, methylcyclohexane, benzene, xylene, chloroform, diethyl ether, and mixtures. Isopentane is readily available and preferred.

In one or more embodiments, the dehydrated catalyst solids content in the slurry can range from a low of about 1 wt %, 5 wt % or 10 wt % to a high of about 15 wt %, 20 wt % or 25 wt %. In one or more embodiments, the dehydrated catalyst solids content in the slurry can be of from 5 wt % to about 22 wt %. In one or more embodiments, the dehydrated catalyst solids content in the slurry can be of from 10 wt % to about 20 wt %. In one or more embodiments, the dehydrated catalyst solids content in the slurry can be of from 17 wt % to about 22 wt %. In one or more embodiments, the dehydrated catalyst solids content in the slurry can be about 18 wt % or about 19 wt %, or about 20 wt % or about 21 wt %.

The one or more titanium-containing compounds can be added to the slurry containing the supported chrome catalyst. Any suitable titanium-containing compound can be used. Illustrative compounds include those having the structures $(R_1)_n Ti(OR_1)_m$, $(R_2O)_m Ti(OR_1)_n$, $(R_1)_n TiX_m$, $(RO)_n TiX_m$ and $TiX_4$ where m is 1, 2, 3 or 4, n is 0, 1, 2 or 3 and m+n=4; $R_1$ is a $C_1$ to $C_{12}$ alkyl, aryl group, cycloalkyl group, or any combination thereof, such as aralkyl and alkaryl groups; $R_2$ is $R_1$, a cyclopentadienyl group, $C_2$ to $C_{12}$ alkenyl groups, such as ethenyl, propenyl, isopropenyl or butenyl; and X is chlorine, bromine, fluorine or iodine.

In one or more embodiments, the titanium-containing compound is or includes titanium tetrachloride, titanium tetraisopropoxide (or titanium tetraisopropyltitanate (TiPT)), titanium tetrabutoxide, derivatives thereof, or mixtures thereof. The titanium-containing compound is preferably titanium tetraisopropyltitanate (TiPT). Other suitable compounds are described in U.S. Pat. No. 3,622,521 and Netherlands Patent Application 72-10881.

In one or more embodiments, the one or more titanium-containing compounds can be deposited or otherwise disposed on the supported chrome catalyst from a hydrocarbon solution thereof. In one or more embodiments, a solution containing the one or more titanium-containing compounds can be added directly to the supported chrome catalyst slurry. In one or more embodiments, the supported chrome catalyst slurry can be added directly to a solution containing the one or more titanium-containing compounds.

In one or more embodiments above or elsewhere herein, the titanium-containing compound can be carried in the same hydrocarbon as the dried chrome catalyst slurry or a different hydrocarbon. The preferred solvent is isopentane. For simplicity and ease of description, the terms "solvent" and "diluent," when in reference to the catalyst synthesis described, are used interchangeably to refer to a hydrocarbon in which the supported chrome catalyst is suspended and the titanium-containing compound is at least partially dissolved.

The catalyst mixture of solvent (i.e. hydrocarbon), supported chrome catalyst, and titanium-containing compound(s) is then treated to remove the hydrocarbon. The hydrocarbon can be removed by flashing and/or evaporating the catalyst mixture. A nitrogen purge can also be used to remove any remaining solvent to provide a free flowing powder.

The supported catalyst containing chromium and titanium ("titanated chrome catalyst") is then placed in an activator and activated to a chromium +6 oxidation state. The activator can be heated by internal heating rods; an external source of heat applied to the activator walls, such as electrical heat or by heat of combustion; provision for heating the gas entering the activator via one or more gas inlet valves; or by a combination of such heating sources, all of which can be measured and controlled using known techniques in the art. It should be noted that, as used herein, the term "activator temperature" is typically measured at or very close to the catalyst bed and thus, as would be understood by one of skill in the art, "activator temperature" is taken as surrogate for the temperature of the catalyst.

Using dry (anhydrous) nitrogen gas, argon, or other inert gas, the temperature of the fluidized bed in the activator can be ramped from room temperature to a preselected temperature between about 370-540° C. (700-1000° F.), or 370-450° C. (700-850° F.), or 370-425° C. (700-800° F.), or 370 to 400° C. (700-750° F.), for a hold period, preferably at least for a time sufficient for most if not all the free water, along with a substantial portion of any hydrocarbon residues, to be driven off from the supported catalyst. This temperature hold under nitrogen or other inert environment is preferably held for one minute to up to 6 hours. In one or more embodiments, the hold time can range from 2 to 10 hours. In one or more embodiments, the hold time can range from 3 to 6 hours. In one or more embodiments, the hold time can range from 4 to 6 hours. In one or more embodiments, the hold time can range from 5 to 6 hours.

In addition to the temperature hold period described above, additional hold periods at temperatures lower than 370° C. (700° F.) can be used. For example, the activator temperature can be ramped up from room temperature to about 205° C.±25° C. (400° F.±45° F.) at about 220° C./hr (400° F./hr) and held at this temperature under a nitrogen atmosphere for a period of one minute to up to about 6 hours, or even more, followed by a temperature ramp up to a preselected temperature between about 370-540° C. (700-1000° F.), or 370-450° C. (700-850° F.), or 370-425° C. (700-800° F.), or 370 to 400° C. (700-750° F.), at a rate of about 200° C./hr (350° F./hr), while still under an inert atmosphere. This temperature and inert atmosphere can then be held constant for a period of from one minute up to about 6 hours. Even greater hold periods are possible, however the benefits, if any, are generally offset by the greater cost.

In one embodiment, the activator temperature of between about 370-540° C. (700-1000° F.), or 370-450° C. (700-850° F.), or 370-425° C. (700-800° F.), or 370 to 400° C. (700-750° F.), is held, as mentioned, for a period before continuing the temperature ramping and/or changing the treatment gas from entirety nitrogen (or other inert gas) to at least partial oxygen, as further described below.

The temperature hold periods described above can be selected to be any time within the time ranges specified. Thus, the present invention contemplates embodiments wherein the temperature is held at a preselected temperature between about 370-540° C. (700-1000° F.), or 370-450° C. (700-850° F.), or 370-425° C. (700-800° F.), or 370 to 400° C. (700-750° F.), for any period between 1 minute to up to six hours or more, such as for a period of one hour, a period of from one hour for up to two hours, a period of from two hours for up to three hours, a period of from three hours for up to four hours, a period of from four hours for up to five hours, a period of from one hour to five hours, or any period of time within the aforementioned ranges, prior to changing the temperature conditions of the activator, and/or prior to changing the atmosphere of the activator, as described in more detail herein.

In another embodiment, the activator includes both heater rods and gas inlet preheaters, and both are used during ramping and during the temperature hold period. In an embodiment, however, the temperatures of the activator and the gas inlet preheaters are not identical. Thus, in one preferred embodiment during the hold period the one or more gas inlet preheaters heat the entering inert gas to a temperature of about 450° C. (850° F.) while the activator heating rods are allowed to adjust to a temperature which will allow the activator temperature to be maintained at the selected temperature within the range of 370-540° C. (700-1000° F.), or 370-450° C. (700-850° F.), or 370-425° C. (700-800° F.), or 370 to 400° C. (700-750° F.).

In another embodiment, after a certain period of time at the hold temperature of 370-540° C. (700-1000° F.), or 370-450° C. (700-850° F.), or 370-425° C. (700-800° F.), or 370 to 400° C. (700-750° F.). Prior to a change over to a partial oxidizing atmosphere, the temperature of the gas inlet preheater(s) can be lowered to a temperature below the activator temperature. Thus, in one embodiment, the temperature of the gas inlet preheater(s) is lowered to about 400° C. or less or in yet another embodiment it is lowered still further to as low as about 200° C. or less. In these embodiments wherein the entering gas effectively provides a coolant to the activator, the heating rods (or external heating source) must provide additional heat to maintain the temperature of the activator constant.

The nitrogen (or inert gas) treatment may occur to an even higher temperature, however (again without wishing to be bound by theory) it is believed that above about 540° C. (1000° F.) the supported chromium and titanium catalyst can be converted partially or wholly into a form ("green batch") which is less amenable to a subsequent treatment with oxygen. A green batch may also be observed under conditions where the oxygen is present at a concentration of less than about 20% by volume, i.e., less oxygen than is normally present in air. Thus temperatures of above about 540° C. should be avoided during the treatment under pure nitrogen or other inert gaseous treatment and during conditions where pure nitrogen is mixed with air.

After the aforementioned treatment under nitrogen, oxidant can be introduced into the activator, preferably oxygen gas, and more preferably air. It is preferred that the temperature of the activator be between about 370-425° C. (700-800° F.), or about 370 to 400° C. (700-750° F.), or about 400° C. (750° F.).

Preferably oxygen is introduced into the activator by adding a small amount of air to the gas inlet mixture. In an embodiment of the invention the addition of air is controlled so that the observed temperature spike does not exceed 590° C. (1100° F.), or 480° C. (900° F.), or 450° C. (850° F.) or about 425° C. (800° F.).

In a preferred embodiment, a 370-400° C. )700-750° F.) nitrogen atmosphere temperature hold is maintained for about 3.5 hours and then air is introduced in with the nitrogen flow so that the gas entering through the gas inlet(s) consists of about 2.8% oxygen. This atmosphere is maintained for about 1.5 hours, while controlling the activator temperature so that the observed temperature spike does not exceed 590° C. (1100° F.), or 480° C. (900° F.), or 450° C. (850° F.) and yet or not more than about 425° C. (800° F.).

Preferably, the total gas flow rate is maintained at a constant rate during the change over from nitrogen to oxygen, so that the increase in oxygen to the desired partial pressure is accompanied by a decrease in the nitrogen partial pressure. As previously described, at some point prior to the introduction of a partial atmosphere of oxygen, the gas entering the activator via the inlet valve(s) can serve as a coolant to the activator by lowering the temperature of the inlet preheaters to as low as 400° C. or less or as low as about 200° C. or less. In a preferred embodiment, this lowered temperature of the preheater is maintained during the introduction of a partial air environment.

Even after the treatment for a prolonged period under nitrogen, a temperature spike can be observed when even a small amount of oxygen is first admitted to the activator. However, the observed temperature spike can be controlled to no greater than 480° C. (900° F.), or no greater than 450° C. (850° F.) or no greater than 425° C. (800° F.).

After the temperature spike subsides and the activator temperature approaches the preselected temperature within the range of 370-540° C. (700-1000° F.), or 370-450° C. (700-850° F.), or 370-425° C. (700-800° F.), or 370 to 400° C. (700-750° F.), the atmosphere can be converted to 100% air and the temperature can be ramped up to the final treatment temperature. Activation can then be completed, for example, by contacting the catalyst in the activator with an oxidizing atmosphere, preferably an atmosphere of air or atmosphere consisting essentially of air. It is more preferred that the final temperature of the activator be at least about 425° C. (800° F.), or about 540° C. (1000° F.), or 590° C. (1100° F.) up to about 870° C. (1600° F.). In a preferred embodiment, the temperature is ramped up to the final hold temperature at about 65° C./hr (150° F./hr). Addition details can be found in US 2006/0089468.

In a preferred embodiment, the final temperature can be held for a period of time of from 1 minute up to about 6 hours or even longer. More preferably, the final temperature of between 425° C. (800° F.) and 870° C. (1600° F.) is held between 4 hours and 6 hours. The thus-activated, titanated chrome catalyst can then be cooled to about 150-315° C. (300-600° F.), and then purged with nitrogen while cooling to room temperature.

The resulting, activated titanated chrome catalyst can contain, based on the combined weight of the support, chromium and titanium about 0.05 wt % to about 3.0 wt % chromium (calculated as elemental chromium). In one or more embodiments, the chromium content is of from about 0.3 wt % to about 2.0 wt %. In one or more embodiments, the chromium content is of from about 0.6 wt % to about 1.3 wt %. In one or more embodiments, the chromium content is of from about 0.8 wt % to about 1.1 wt % chromium. In one or more embodiments, the chromium content is about 1.0 wt %.

In one or more embodiments, the resulting, activated titanated chrome catalyst can contain, based on the combined weight of the support, chromium and titanium, about 0.5 wt % to about 9.0 wt % titanium (calculated as elemental titanium). In one or more embodiments, the titanium content is of from about 1.0 wt % to about 8.0 wt %. In one or more embodiments, the titanium content is about 1.0 wt % to about 6.0 wt %. In one or more embodiments, the titanium content is about 3.0 wt % to about 6.0 wt %. In one or more embodiments, the titanium content is about 2.5 wt % to about 3.5 wt %. In one or more embodiments, the titanium content is about 3.0 wt %.

Polymerization Process

In one or more embodiments, the activated titanated chrome catalyst can be used to polymerize one or more olefins. Such olefin polymerization can be carried out in any process for polymerizing one or more alpha olefins and optional comonomer(s), including gas phase, solution, slurry, and bulk processes. Preferably, the activated titanated chrome catalyst can be used to polymerize one or more olefins in a slurry process within one or more slurry reactors, such as one or more stirred slurry reactors or slurry loop reactors.

A slurry loop reactor can generally be described as a loop-shaped continuous tube. In some instances, the reactor design can be generally "O" shaped. One or more fluid circulating devices, such as an axial pump, can be used to circulate the reactor constituents within the tube. The fluid circulating devices are preferably designed to provide high velocity of motion and a very intensive and well-defined mixing pattern of the reactor constituents. The reactor can be totally or partially jacketed with cooling water in order to remove heat generated by polymer polymerization.

In the slurry loop reactor, the polymerization medium includes monomer, optional comonomer, and a hydrocarbon solvent or diluent, such as aliphatic paraffin such as propane, isobutane, hexane, haptane, or cyclohexane, for example, or an aromatic diluent such as toluene, or mixtures thereof. As such, the reactor constituents generally are a combination of both solids, such as supported catalyst and polymerized olefin, and liquid solvent or diluent. The percentage of solids within the reactor constituents can be as high as 60 wt % of the reactor constituents. Typically, the weight percent of solids is in the range of 35 to 55 wt %.

The polymerization can be carried out at a temperature of from a lower limit of 50° C. or 60° C. or 70° C. or 80° C. or 90° C. to an upper limit of 150° C. or 140° C. or 130° C. or 120° C. or 110° C. or 100 C. In a particular embodiment, the polymerization is carried out at a temperature of greater than 95 C or greater than 100° C. In another particular embodiment, the polymerization can be carried out at a temperature $T_R$ of from greater than 100° C. to 110° C. (i.e., 100° C.<$T_r$≦110° C.). Pressures can vary from about 100 to about 700 psia (0.69-4.8 MPa). Additional details can be found in U.S. Pat. No. 5,274,056, U.S. Pat. No. 4,182,810, U.S. Pat. No. 6,204,344 and WO 94/21962.

The slurry loop olefin polymerization reactor can be operated in a single stage process or in multistage processes. In multistage processing, the polymerization of olefins is carried out in two or more reactors. These reactors can be configured in series, in parallel, or a combination thereof.

Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include conjugated and non-conjugated dienes, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11;12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

EXAMPLES

The foregoing discussion can be further described with reference to the following non-limiting examples. The following examples shown resins produced from the supported titanated chrome catalyst described. The resins showed an unexpected and surprising improvement in tab swell without loss of ESCR.

Examples 1-2 show resin produced from supported titanated chrome catalysts prepared according to one or more embodiments described and the resin produced therefrom. Comparative Examples 1, 2, 9 and 10 shown resins produced form Sylopol™ HA30 catalysts (supported chrome catalyst). Comparative Example 3 shows resin produced from C25307 and Comparative Example 4 shows resin produced from C23307, both titanated chrome catalysts available from PQ Corporation. Comparative Examples 5-8 shows resins produced from C25305 also a titanated chrome catalyst available from PQ Corporation.

The catalysts of Examples 1-2 were synthesized as follows. HA30, supported chrome catalysts, from W. R. Grace were first dehydrated. Total drying time was about 18 hours. $N_2$ flow was about 3.5 cm/sec. The temperature was ramped to 230° C. at 50° C./hr and held at 230° C. for 6 hours. The catalyst was cooled and then transferred to an agitated titanation vessel.

The conditions of the agitated titanation vessel were 35° C. under 1 bar $N_2$. To the vessel, with the agitator on, the dehydrated, supported chrome catalyst (408 kg prior to dehydration) was added with 2800 liters of isopentane. The temperature was raised to 60° C. 141 kg TiPT was added and pressure was raised with nitrogen to 3 bar. The mixture was mixed for 1 hr. Temperature was raised to 85° C. to begin isopentane recovery.

After the agitator motor amp peak subsided, the solvent recovery was stopped, and drying began. During the drying step, a nitrogen purge was set at 18-20 kg/hr and the temperature was raised to 100° C. Twenty-one (21) hrs after amp peak, drying was stopped by lowering the temperature to 35° C., raising the vessel pressure to 3 bar, and blocking in the $N_2$.

Comparative Examples 1-2, were activated in a fluidizing bed type activator. The activator had heating rods to heat the catalyst bed and the gas inlets were preheated. The catalysts were fluidized with 144 CFM dry air and the temperature of the activator/catalyst bed was ramped up at about 222° C./hr (400° F./hr) to 205° C. (400° F.). It was held at this temperature for 4 hours and then ramped at about 195° C./hr (350° F./hr) to a hold at about 400° C. (750° F.). The catalyst was held in the activator under these conditions for about 3.5 hours.

The temperature was ramped using both the activator probe heaters and the gas inlet preheaters, at about 83° C./hr (150° F./hr) to a 6 hour hold at the specified temperature in Table 1 and held for 6 hours, when activation was complete. The catalyst was then cooled to about 150-205 C (300-400 F) under an atmosphere of air and then fluidized with nitrogen and allowed to cool to room temperature.

The catalyst of Example 1-2 and Comparative Examples 3-4, were also activated in a fluidizing bed type activator. The activator had heating rods to heat the catalyst bed and the gas inlets were preheated. The catalyst was fluidized with dry $N_2$ and the temperature of the activator/catalyst bed was ramped up at about 222° C./hr (400° F./hr) to 205° C. (400° F.). It was held at this temperature under a nitrogen flow of about 126 CFM (cubic feet per minute) for 4 hours and then ramped at about 195° C./hr (350° F./hr) to a hold at about 400° C. (750° F.) under a nitrogen flow of about 144 CFM. The catalyst was held in the activator under these conditions for about 3-5 hours. The gas inlet preheaters were set to 450° C. (850° F.) during the period that the activator temperature was held at 400° C. (750° F.) under nitrogen, and shortly before the introduction of the 20 CFM of air, the gas inlet preheaters were lowered to about 200° C. (400° F.).

Then a controlled amount of oxidant, in the form of dry air at a rate of 20 CFM, with a decrease in the nitrogen flow to approximately 122 CFM, so that the amount of oxygen in the activator was at a concentration of about 2.8% by volume, while maintaining the activator at about 400° C. (750° F.). The gas inlet preheaters remained set at about 200° C. (200° F.) during this period.

The atmosphere was then switched to 100% dry air and the temperature was ramped using both the activator probe heaters and the gas inlet preheaters, at about 83° C./hr (150° F./hr) to a 6 hour hold at the specified temperature in Table 1 and held for 6 hours, when activation was complete. The catalyst was then cooled to about 150-205° C. (300-400° F.) under an atmosphere of air and then fluidized with nitrogen and allowed to cool to room temperature.

The thus-activated catalysts from Examples 1 and 2 and Comparative Examples 1-4 were used in a slurry loop polymerization process to produce HDPE resin on a commercial scale. Slurry polymerization was conducted at the following conditions:

Reactor temperature: 210-218 F (100° C.-103° C.);
Reactor pressure: 500-700 psig (3,447 kPa-4,826 kPa);
Space time yield (STY): 2.5-3.5 lb/(hr*gal);
Ethylene concentration: 2.5-4.0 wt % in the diluent (isobutane);
Comonomer (hexene) concentration: 0.1-0.2 wt % in the diluent (isobutane);
Hydrogen concentration: 0.0-0.5 wt % in the diluent (isobutane);
Wt % solids in the reactor: 35-55 wt %;

The catalyst loadings and activation temperatures as well as certain resin properties are summarized in Table 1 below.

TABLE 1

|  |  | Ex. 1 | Ex. 2 | Comp Ex 1 | Comp Ex 2 | Comp Ex 3 | Comp Ex 4 |
| --- | --- | --- | --- | --- | --- | --- | --- |
| Cr | wt % | 0.9 | 0.9 | 0.9 | 0.9 | 1 | 1 |
| Ti | wt % | 2.5 | 2.5 | — | — | 3.5 | 3.5 |
| SA | m$^2$/g | 370 | 370 | 370 | 370 | 480 | 350 |
| PV | cc/g | 1.4 | 1.4 | 1.4 | 1.4 | 2.3 | 2.1 |
| Act. Temp | ° F. | 1300 | 1300 | 1510 | 1510 | 1200 | 1300 |
| Act. Temp | ° C. | 704 | 704 | 821 | 821 | 649 | 704 |
| ESCR | hr | 46 | 133 | 24 | 46 | 475 | 74 |
| MI-2 | g/10 min | 0.33 | 0.31 | 0.29 | 0.34 | 0.28 | 0.31 |
| MI-22 | g/10 min | 32.4 | 31.2 | 32.3 | 33.6 | 23.3 | 34 |
| MFR |  | 98 | 101 | 111 | 99 | 83 | 110 |
| Density | g/cc | 0.9548 | 0.9502 | 0.9544 | 0.9500 | 0.9522 | 0.953 |
| Mw/Mn |  | 23.72 | 21.18 | 10.56 | 10.28 | 34.82 | 11.59 |
| Mz/Mw |  | 10.85 | 10.15 | 10.36 | 9.59 | 12.05 | 5.87 |
| Ash | wt % | 0.015 | 0.015 | 0.02 | 0.024 | 0.025 | 0.028 |
| Tab Swell | in | 6.08 | 6.01 | 6.01 | 5.98 | 6.53 | 6.26 |
| Tab Swell | mm | 154 | 153 | 153 | 152 | 166 | 159 |

Environmental Stress Crack Resistance (ESCR) (bent strip) was determined in accordance with ASTM D 1693, condition B, 100% IGEPAL™. IGEPAL™ is a nonylphenoxy poly(ethylenoxy)ethanol surfactant available from Rhone Polenc, Cranbury, N.J. All ESCR values cited herein are ASTM D 1693 condition B, 100% IGEPAL™ F50 values, and are given in units of hours.

Notched Constant Tensile Load (NCTL) is a stress crack resistance test for highway drainage pipe, and was measured in accordance with ASTM D-5397-99, using a yield stress of 4000 psi (15% load stress of 600 psi). Each reported value is the average hours to break of five samples.

Polymer density (g/cm$^3$) was determined using a compression molded sample, cooled at 15° C. per hour and conditioned for 40 hours at room temperature according to ATMS D 1505-68 and ASTM D1928, procedure C.

Polymer melt flow rates were determined at 190° C. according to ASTM D-1238-57T. $I_{21.6}$ is the "flow index" or melt flow rate of the polymer measured according to ASTM D-1238-57T, condition F, and $I_{2.16}$ is the "melt index" or melt flow rate of the polymer measured according to ASTM D-1238-57T, condition E. The ratio of $I_{21.6}$ to $I_{2.16}$ is the "melt flow ratio" or "MFR". The melt flow rate $I_{21.6}$ is also sometimes termed the "high load melt index" or HLMI. Melt flow rates are reported in units of grams per 10 minutes (g/10 min) or equivalently decigrams per minute (dg/min).

Tab swell measurement refers to the width of the flash at the bottom of a molded bottle. The bottles used in these measurements were 1 gallon bottles (typically used in the industry for containing consumer fluids including but not limited to milk and water) with weights maintained at a 58 g target and produced at a constant cycle time. The molding machine used to produce the bottles was Uniloy multi-head machine with reciprocating screw design and diverging tooling. A minimum of 5 measurements per head are averaged to calculate the reported tab swell measurement.

As shown in Table 1, the resins produced in Example 1 and 2 had similar densities to those of Comparative Examples 1 and 2, respectively. As expected, the titanated chrome catalyst of Examples 1 and 2 produced resin having significantly improved ESCR but unexpectedly, only a slight increase in tab swell compared to the resins produced from supported chrome catalysts (Comparative Examples 1 and 2).

Figure 1:
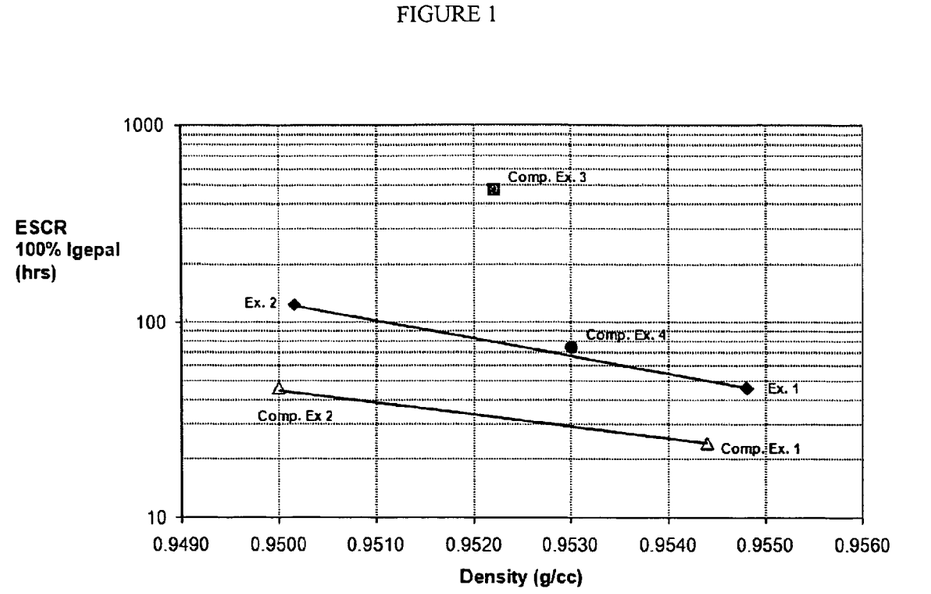
FIG. 1 is a graphic illustration of ESCR (ASTM D 1693, condition B, 100% IGEPAL™) versus density generated from the data of Table 1.

FIG. 1 is a graphic illustration of ESCR (ASTM D 1693, condition B, 100% IGEPAL™) versus density generated from the data of Table 1. An extrapolation of ESCR based on the densities of the resins (ESCR is directly dependent on density) shows comparable ESCR of Examples 1 and 2 and Comparative Examples 3 and 4, which are also resins produced from titanated chrome catalyst. Surprisingly, however, the resins produced from the titanated chrome catalyst according to embodiments described herein (i.e. Examples 1 and 2) exhibited a significantly lower tab swell (more than 5% difference) compared to the resins of Comparative Examples 3 and 4.

Examples 3-7 and Comparative Examples 5-10 in Table 2 were prepared in a lab scale slurry process. In Examples 3-7, HA30 (supported chrome catalyst) was dehydrated with heat at 230° C. for 6 hours, and transferred to a coating vessel. In the coating vessel, an isopentane slurry was formed by adding, under stirred conditions, 30 g isopentane to 10 g HA30. Then TiPT was added to the slurry such that 1.5-2.5 wt. % titanium was present on the HA30. The mixture was then dried with heat and a nitrogen purge until it was a free-flowing solid. The free-flowing solid was transferred into a fluid bed activator where it underwent heat activation.

For all lab scale runs, the catalysts were activated by placing them in a cylindrical tube and fluidized in dry air at 2 feed per minute linear velocity while being heated to a pre-determined temperature, anywhere from 480° C. to 820° C., and held at the pre-determined temperature for six hours. The activated catalysts were recovered as a free-flowing powder. Once activated, the catalysts were cooled to ambient temperature and stored under nitrogen for later use in polymerization.

Polymerizations were conducted in a six-liter autoclave equipped with a mechanical overhead stirrer and an external jacket for regulating temperature. The polymerization was performed by providing the continuous addition of ethylene at a fixed total pressure. The reactor had thermocouples to control the temperature of the external jacket and the internal temperature of the reactor during the polymerization. The reactor temperature was 103° C. to 107° C. Ethylene fed to the reactor was passed through an electronic gas flow meter to permit continuous monitoring of the ethylene flow to the reactor. All handling of the polymerization reaction components was carried out using airless techniques to exclude oxygen and water. The polymerization was conducted in isobutane slurry that had been dried and deoxygenated. All runs were conducted at 460 to 500 psig (3.45 MPa) reactor pressure. Upon completion of the polymerization test run (normally 45 to 60 minutes) the reactor was vented to the atmosphere to remove isobutane and unreacted ethylene. The remaining particle form polymer was dried with a nitrogen gas flow at 70° C. for 20 minutes. Finally, the reactor was cooled and the dry polyethylene powder recovered.

Figure 2:
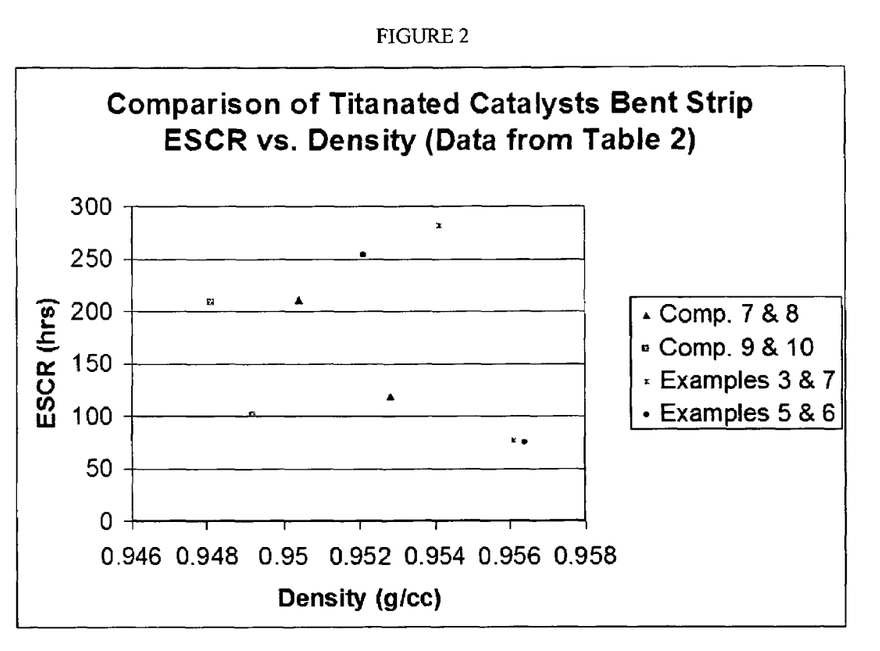
FIG. 2 is a graphic illustration of ESCR (ASTM D 1693, condition B, 100% IGEPAL™) versus density generated from the data of Table 2.

The catalyst loadings and activation temperatures as well as certain resin properties are summarized in Table 2 below. FIG. 2 is a graphic illustration of ESCR (ASTM D 1693, condition B, 100% IGEPAL™) versus density generated from the data of Table 2. These examples show improved ESCR for the titanated catalysts.

TABLE 2

Lab reactor data

| Example | Activ. Temp (° C.) | Tl % | Cr % | Prod gPE/gCat | Act (Prod/hr) | Powder MI | Powder HLMI | Powder Density | Plaque HLMI | Plaque Density | ESCR | MW (×1000) | Mw/Mn | Rx Temp (° C.) |
|---|---|---|---|---|---|---|---|---|---|---|---|---|---|---|
| Comp. 5 | 593 | 2.5 | 1 | 2360 | 3147 | 0.12 | 12.2 | 0.9516 | 9.3 | 0.9534 | 272 | 188.1 | NA | 103.3 |
| Comp. 6 | 593 | 2.5 | 1 | 3098 | 4131 | 0.11 | 11.2 | 0.9497 | 8.1 | 0.9525 | 206 | 211.1 | 24.6 | 103.3 |
| Comp. 7 | 650 | 2.5 | 1 | 2514 | 3353 | 0.20 | 16.8 | 0.9509 | 14.0 | 0.9528 | 119 | 199.9 | 24 | 103.3 |
| Comp. 8 | 650 | 2.5 | 1 | 2882 | 3843 | 0.20 | 17.0 | 0.9485 | 14.0 | 0.9504 | 211 | 201.8 | 24.5 | 103.3 |
| Comp. 9 | 650 | — | 0.9 | 2353 | 4278 | 0.17 | 16.1 | 0.9472 | 11.5 | 0.9481 | 209 | 157.3 | 10.1 | 105 |
| Comp. 10 | 650 | — | 0.9 | 3081 | 4108 | 0.20 | 19.1 | 0.9492 | 11.5 | 0.9492 | 102 | 157.8 | 13.7 | 105 |
| Ex. 3 | 593 | 1.5 | 0.9 | 2617 | 3739 | 0.12 | 13.8 | 0.9533 | 9.4 | 0.9541 | 85 | 170.3 | 30.2 | 103.3 |
| Ex. 4 | 593 | 1.5 | 0.9 | 2419 | 3225 | 0.15 | 17.9 | 0.9544 | 11.2 | 0.9567 | 76 | 187.1 | 25.5 | 103.3 |
| Ex. 5 | 650 | 1.5 | 0.9 | 2329 | 3105 | 0.19 | 21.3 | 0.9546 | 15.6 | 0.9564 | 75 | 197.9 | 17.4 | 103.3 |
| Ex. 6 | 650 | 1.5 | 0.9 | 2487 | 3316 | 0.10 | 12.5 | 0.9511 | 8.0 | 0.9521 | 254 | 209.7 | 24 | 103.3 |
| Ex. 7 | 650 | 2.5 | 0.9 | 2680 | 4347 | 0.14 | 17.5 | 0.9536 | 11.2 | 0.9561 | 77 | 175.4 | 21.8 | 102 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow. Any two or more of the limitations of the dependent claims dependent from the same independent claim in the appended claims can be combined for additional embodiments of the invention.

What is claimed is:

1. A method for polymerizing ethylene, comprising:
preparing a supported catalyst composition comprising the steps of:
(a) dehydrating a chromium impregnated support;
(b) at least partially dissolving a titanium-containing compound in one or more inert solvents to provide a solution comprising the titanium-containing compound;
(c) contacting the dehydrated chromium impregnated support with the titanium-containing solution to provide a mixture comprising the solvent, titanium-containing compound and chromium impregnated support;
(d) removing the solvent from the mixture; and
(e) activating the product of step (d) at a temperature of at least 800° F. (427° C.) to provide a supported titanated chrome catalyst composition;
feeding the supported titanated chrome catalyst composition to a slurry reactor; and
contacting the supported catalyst composition and an optional co-catalyst, under polymerization conditions within the slurry reactor, with ethylene.

2. The method of claim 1, wherein the chromium impregnated support is dehydrated at a temperature of about 302° F. (150° C.) to about 572° F. (300° C.) for at least about 16 hours in a nitrogen atmosphere.

3. The method of claim 1, wherein the temperature of step (e) is at least 1100° F. (593° C.) and held for at least 4 hours.

4. The method of claim 1, wherein the temperature of step (e) is at least 1100° F. (593° C.) and held for 4 to 6 hours.

5. The method of claim 1, wherein the temperature of step (e) is of from 1100° F. (593° C.) to 1600° F. (871° C.) and held for at least about 4 hours.

6. The method of claim 1, wherein the temperature of step (e) is of from 1100° F. (593° C.) to 1600° F. (871° C.) and held for at least 4 to 6 hours.

7. The method of claim 1, wherein the catalyst composition contains about 0.05% to about 3.0% by weight of elemental chromium.

8. The method of claim 1, wherein the catalyst composition contains about 0.7% to about 0.12% by weight of elemental chromium.

9. The method of claim 1, wherein the support comprises silica.

10. The method of claim 1, wherein the titanium-containing compound is selected from the group consisting of titanium tetrachloride, titanium tetraisopropoxide, titanium tetraisopropyltitanate (TiPT), titanium tetrabutoxide, derivatives thereof, or mixtures thereof.

11. The method of claim 1, wherein the titanium-containing compound comprises titanium tetraisopropyltitanate (TiPT).

12. The method of claim 1, wherein the catalyst composition contains about 0.5% to about 9.0% by weight of elemental titanium.

13. A method for polymerizing ethylene, comprising:
preparing a supported catalyst composition comprising the steps of:
(a) dehydrating a chromium impregnated support;
(b) at least partially dissolving a titanium-containing compound in one or more inert solvents to provide a solution comprising the titanium-containing compound;
(c) contacting the dehydrated chromium impregnated support with the titanium-containing solution to provide a mixture comprising the solvent, titanium-containing compound and chromium impregnated support;
(d) removing the solvent from the mixture; and
(e) activating the product of step (d) at a temperature of at least 800° F. (427° C.) to provide a supported titanated chrome catalyst composition;
feeding the supported titanated chrome catalyst composition to a slurry reactor; and
contacting the supported catalyst composition, under polymerization conditions within the slurry reactor, with ethylene and one or more comonomers.

14. The method of claim 13, wherein the chromium impregnated support is dehydrated at about 100° C. to about 500° C. for at least about 16 hours.

15. The method of claim 13, wherein the temperature of step (e) is at least 1100° F. (593° C.) and held for at least 4 hours.

16. The method of claim 13, wherein the temperature of step (e) is of from 1100° F. (593° C.) to 1600° F. (871° C.) and held for at least about 4 hours.

17. The method of claim 13, wherein the catalyst composition contains about 0.05% to about 3.0% by weight of elemental chromium.

18. The method of claim 13, wherein the titanium-containing compound is selected from the group consisting of titanium tetrachloride, titanium tetraisopropoxide, titanium tetraisopropyltitanate (TiPT), titanium tetrabutoxide, derivatives thereof, or mixtures thereof.

19. The method of claim 13, wherein the titanium-containing compound comprises titanium tetraisopropyltitanate (TiPT).

20. The method of claim 13, wherein the catalyst composition contains about 0.5% to about 9.0% by weight of elemental titanium.

* * * * *